United States Patent [19]

Niino et al.

[11] 4,259,154
[45] Mar. 31, 1981

[54] NUCLEAR REACTOR CONTAINMENT STRUCTURE

[75] Inventors: Tuyoshi Niino; Yuichi Uchiyama, both of Hitachi, Japan

[73] Assignee: Hitachi, Ltd., Japan

[21] Appl. No.: 829,243

[22] Filed: Aug. 30, 1977

[30] Foreign Application Priority Data

Sep. 3, 1976 [JP] Japan ............... 51/104903

[51] Int. Cl.³ ........................... G21C 19/20
[52] U.S. Cl. ........................... 176/38; 176/87
[58] Field of Search ............. 176/37, 38, 87

[56] References Cited

U.S. PATENT DOCUMENTS

| 3,320,969 | 5/1967 | Gordon | 176/87 |
|---|---|---|---|
| 3,454,080 | 7/1969 | Kunzli | 176/87 |
| 3,537,420 | 11/1970 | Chollet | 176/87 |
| 3,605,362 | 9/1971 | Sweeny | 176/38 |
| 3,668,069 | 6/1972 | Ulrich et al. | 176/38 |
| 3,755,079 | 8/1973 | Weinstein et al. | 176/87 |
| 3,937,651 | 2/1976 | Schubert et al. | 176/87 |
| 3,963,563 | 6/1976 | Beine et al. | 176/38 |
| 4,123,325 | 10/1978 | Ichiki et al. | 176/87 |

FOREIGN PATENT DOCUMENTS 51-29279  8/1976  Japan ......................... 176/38

OTHER PUBLICATIONS

Mechanical Engineers Handbook, 6th Ed., McGraw Hill Book Co., New York, N.Y. (1958), pp. 12-60-1-2-64, Baumeister, Ed.

Primary Examiner—S. A. Cangialosi
Attorney, Agent, or Firm—Craig and Antonelli

[57] ABSTRACT

A nuclear reactor containment structure including a diaphragm floor for dividing a closure casing into a drywell and a pressure suppression chamber, the diaphragm floor being supported at its inner peripheral end by a pedestal for a pressure vessel and abutting at its outer peripheral end against shear keys secured to the closure casing. The diaphragm floor includes a concrete layer embedded between structural steels extending radially between the pedestal and the shear keys.

15 Claims, 7 Drawing Figures

NUCLEAR REACTOR CONTAINMENT STRUCTURE

LIST OF PRIOR ART REFERENCES (37 CFR 1.56 (a))

The following reference is cited to show the status of the art:

Japanese Pat. Appln. Kokoku (Post-Exam. Publn.) No. 29279/76 Hitachi Ltd., Aug. 24, 1976.

BACKGROUND OF THE INVENTION

This invention relates to a nuclear reactor containment structure and more particularly to an over and under type nuclear reactor containment structure provided with a diaphragm floor aiming at great increase in its strength at an earthquake.

The over and under type nuclear reactor containment structure includes a diaphragm floor for dividing a closure casing into a drywell and a pressure suppression chamber and the diaphragm floor being provided with a plurality of bent downcomer passing therethrough.

A conventional diaphragm floor is arranged such that its inner end is supported by a pedestal for the pressure vessel, a plurality of radial beams of H-shaped structural steel radially extending from the pedestal and a plurality of lateral beams disposed between the radial beams being provided to form a netlike construction, each of the radial and lateral beams being back coated by a steel plate layer on which a concrete layer is formed through stud bolts, and reinforcing steels protruding radially and inwardly from the inner peripheral end of the concrete layer being embedded into the pedestal to connect the concrete layer to the latter.

Each of the radial beams is supported at its portion near the outer end by a vertical column extending from a bottom portion of the pressure suppression chamber.

The outer end of each of the radial beams is supported by a shear key provided on the inner surface of the closure casing. The shear key is adapted to permit the vertical and radial deformations of the associated radial beam, but restrain the deformation in the circumferential direction of the diaphragm floor.

The diaphragm floor so arranged in the conventional nuclear reactor containment structure acts in such a manner that since the reinforcing steels connect the concrete layer of the diaphragm floor to the pedestal, the horizontal force caused by an earthquake is transmitted from the pedestal through the reinforcing steels to the concrete layer and further through the stud bolts to the radial beams positioned below the concrete layer, and absorbed by the closure casing through the shear keys abutting against the outer ends of the radial beams.

With such an arrangement that the horizontal force is transmitted from the pedestal to the concrete layer and hence to the radial beams positioned therebelow, there are defects in respect of the strength of the reinforcing steels at the connection of the concrete layer and pedestal, the strength of the stud bolts at the connection of the concrete layer and radial beams, and the torsion of the closure casing and diaphragm floor due to the bending moment caused by the difference in the height of the concrete layer and radial beams when the horizontal force transmits through the shear keys.

These problems are serious, especially when a great earthquake occurs.

SUMMARY OF THE INVENTION

An object of the present invention is to provide a nuclear reactor containment structure in which the above-described problems are solved and its strength resisting the horizontal load caused by an earthquake is largely increased.

According to the present invention, there is provided a nuclear reactor containment structure including a diaphragm floor for dividing a closure casing into a drywell and a pressure suppression chamber and the diaphragm floor being supported at its inner peripheral end by a pedestal for a pressure vessel and abutting at its outer peripheral end against shear keys secured to the closure casing, wherein said diaphragm floor comprises structural steels radially extending between said pedestal and said shear keys and a concrete layer embedded between said structural steels.

DESCRIPTION OF THE PREFERRED EMBODIMENT

Figure 1:
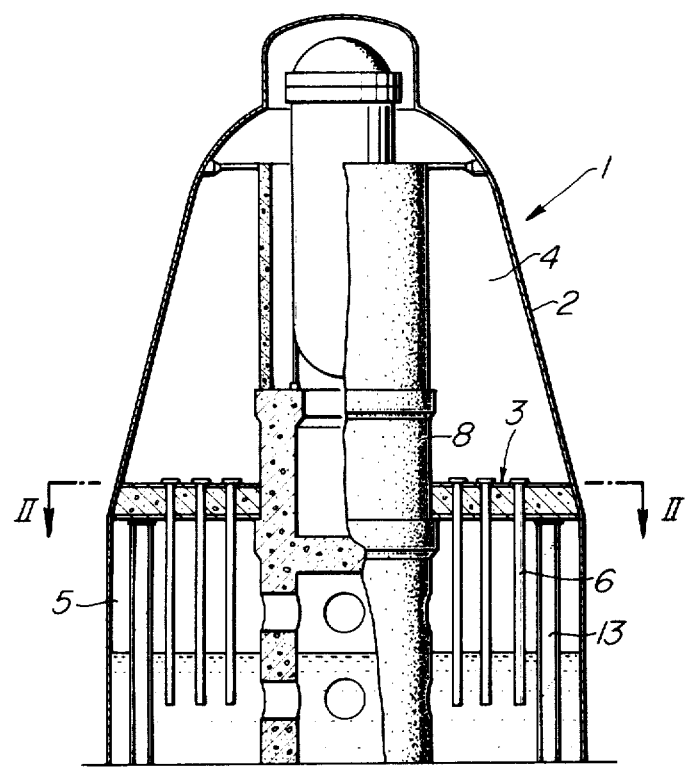
FIG. 1 is a vertical section of an embodiment of the nuclear reactor containment structure in accordance with the present invention.

In FIG. 1, the reference numeral 1 designates the overall structure of the nuclear reactor containment which includes a closure casing 2. The closure casing 2 is divided by a diaphragm floor 3 into a conical drywell 4 and a cylindrical pressure suppression chamber 5, and a plurality of bent downcomer tubes 6 extends through the diaphragm floor 3.

Figure 2:
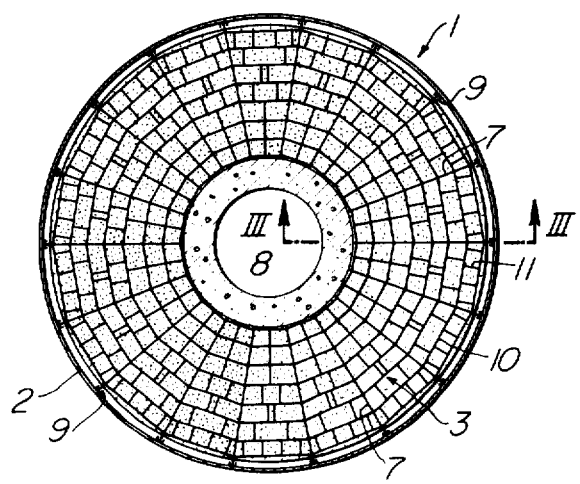
FIG. 2 is a horizontal section taken along a line II—II of FIG. 1.
Figure 4:
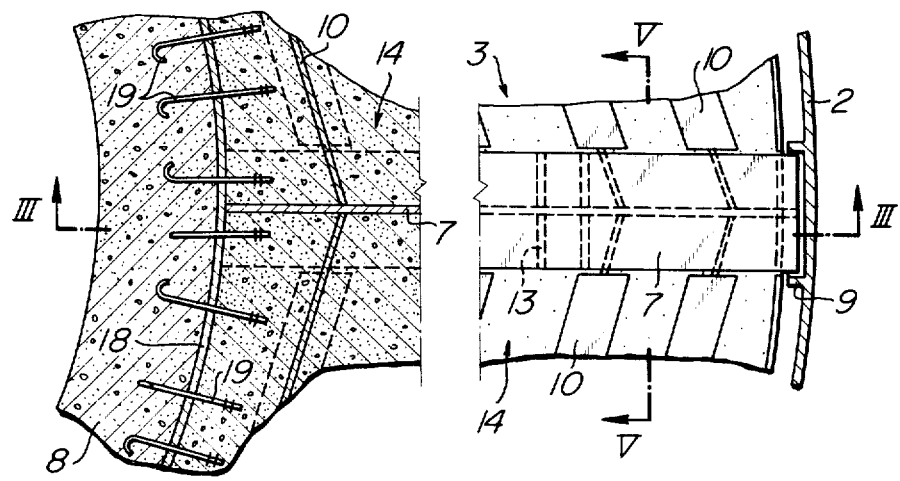
FIG. 4 is a horizontal section taken along a line IV—IV of FIG. 3.
Figure 7:
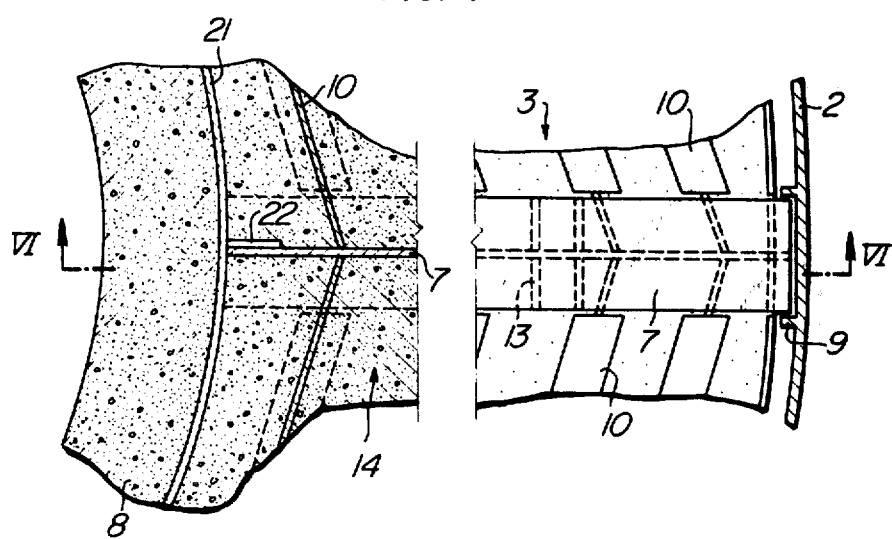
FIG. 7 is a horizontal section taken along a line VII-—VII of FIG. 6.

As shown in FIG. 2, the diaphragm floor 3 is, as in a conventional manner, arranged such that radial beams 7 are supported at their inner ends by a pressure vessel pedestal 8 and are radially positioned from the pedestal 8 to shear keys 9, and a plurality of lateral beams 10 is provided between the radial beams 7 for connection thereof. It is preferable that there are provided auxiliary radial beams 11 between the lateral beams 10 for reinforcement thereof. In this embodiment, each of the beams 7, 10 and 11 is made of a H-shaped structural steel, and as shown in FIGS. 4 and 7 the connection of these beams adjacent to each other is made by cutting away the upper and lower flange portions of one H-shaped structural steel by an appropriate length and then welding the end of the web portion thereof to the side of the web portion of the other H-shaped structural steel.

The lower surface of the respective radial beam 7 is coated a steel plate layer 12 secured thereto by welding or bolts, and the radial beam 7 at its portion near the outer end is supported in the vertical direction by a vertical column 13 extending from a bottom portion of the pressure suppression chamber 5.

The outer end of the respective radial beam 7 is, as in a conventional manner, supported by the shear key 9 provided on the inner surface of the closure casing, and the shear key 9 has an ordinal arrangement adapted to permit the vertical and radial deformations of the associated radial beam, but restrain the deformation in the circumferential direction of the diaphragm floor.

Figure 3:
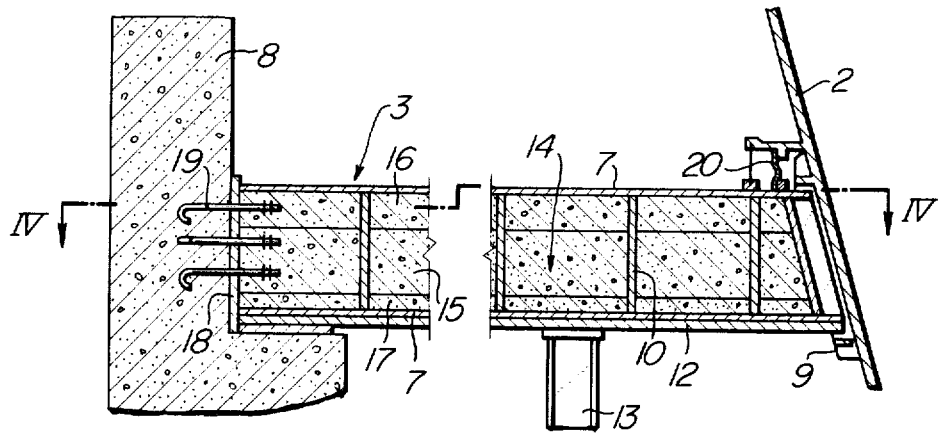
FIG. 3 is a vertical section taken along a line III—III of FIG. 2 and showing an embodiment of an improved diaphragm floor of the nuclear reactor containment structure in accordance of the present invention.
Figure 5:
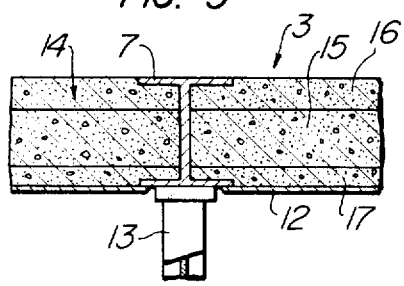
FIG. 5 is a vertical section taken along a line V—V of FIG. 4.

Embedded and provided between the radial beams 7 and on the steel plate layer 8 is a concrete layer 14 which comprises as shown in FIGS. 3 and 5 a central layer 15 including reinforcing steels (not shown), and upper and lower layers 16 and 17 for insulating heat and which are not provided with any reinforcing steel.

The connection between the diaphragm floor 3 and the pedestal 8 is made by means that a plurality of anchor bolts 19 extending through a steel plate 18 provided circumferentially of the pedestal to serve as a mold is embedded in the central and upper concrete layers 15 and 16. The reference numeral 20 designates an annular sealing bellows provided around the outer periphery of the diaphragm floor 3.

With the arrangement described above, the first embodiment of the present invention is advantageous in that since the concrete layer 14 which is a main member for providing the diaphragm floor 3 with rigidity, it is possible to substantially align the axis of the rigidity of the diaphragm floor 3 with the level of the shear keys 9, and the horizontal load at an earthquake is directly transmitted from the pedestal 8 to the shear keys 9 such that there will be caused no bending moment on the shear keys 9 and no such torsion in the closure casing 2 and diaphragm floor 3 as is often caused in the conventional structure.

Since the concrete is embedded between the structural steels, furthermore, it is possible to greatly decrease or omit the amount of the reinforcing steels and there is no need to provide the stud bolts in the connection of the steel plate layer 12 and the concrete layer 14 thereby to expect the simplification of the concrete placing and the increase in the strength of the construction.

Moreover, the overall thickness of the diaphragm floor 3 may be equal to the thickness of the structural steels such that the thickness of the diaphragm floor itself can be reduced to provide a space larger than the drywell of the containment.

Figure 6:
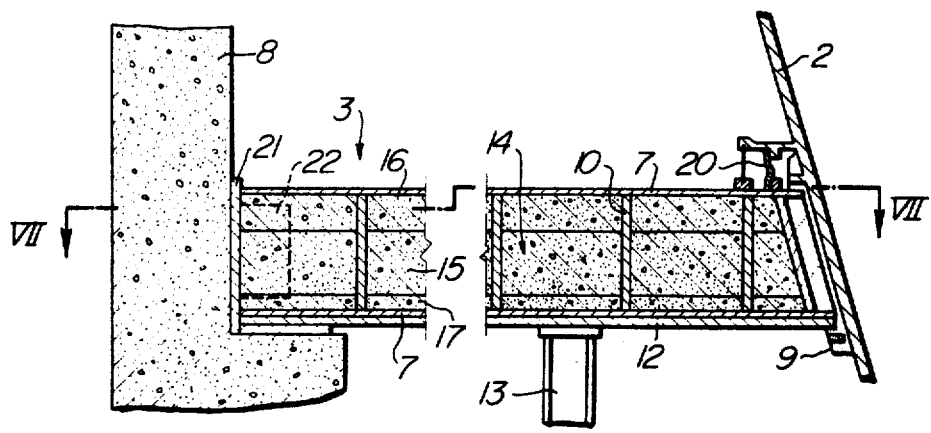
FIG. 6 is a section similar to FIG. 3 and showing another embodiment of the diaphragm floor of the nuclear reactor containment structure of the present invention.

FIGS. 6 and 7 show another embodiment of the connecting means between the diaphragm floor 3 and the pedestal 8.

There is provided a steel plate 21 wound around the outer periphery of the pedestal 8, and a plurality of fin-like anchor plates 22 is welded on the steel plate 21 to extend radially of the nuclear reactor containment, the anchor plates 22 is also welded or bolted to the radial beams 7.

The other parts of this embodiment are similar to those of the first-mentioned embodiment.

Although the embodiments described above are arranged such that the steel plate layer 12 is coated on the lower surface of the radial beams 7, it is also possible to arrange that the steel plate layer is formed by bridging the steel plates across the lower flanges of the H-shaped steel radial beams with the ends of the steel plate riding on the upper side of the lower flanges. In this case, the disposition of the steel plates becomes more easy. In case of using a mold to form the bottom surface of the concrete layer 14, furthermore, it is possible to form the steel plate layer 12 on the upper side of the radial beams 7, and the layer may be omitted therefrom.

It is, moreover, appreciated that the radial beams and the other beams can be made of other structural steels than the H-shaped steels.

What is claimed is:

1. A nuclear reactor containment structure comprising a closure casing, a pedestal within said closure casing for supporting a pressure vessel, a diaphragm floor dividing said closure casing into a drywell and a pressure suppression chamber and supported at its inner peripheral end by said pedestal and at portions near the outer peripheral end of the floor by vertical columns, said outer peripheral end of the diaphragm floor being free from contact with the inner surface of said closure casing, said diaphragm floor including structural steel beams radially extending between said pedestal and said closure casing, and a plurality of shear keys secured to the inner surface of said closure casing and associated with the respective outer ends of said steel beams to permit the vertical and radial movements between said steel beams and said closure casing but restrain the circumferential movement therebetween, said diaphragm floor further including concrete layers disposed between the respective adjacent steel beams.

2. A nuclear reactor containment structure as set forth in claim 1, wherein said concrete layers have the substantially same thickness as the height of said steel beams to form substantially flat upper and lower surfaces of said diaphragm floor.

3. A nuclear reactor containment structure as set forth in claim 1 wherein said diaphragm floor includes a steel plate layer positioned below the concrete layers.

4. A nuclear reactor containment structure as set forth in claim 1 wherein there is provided means for connecting an inner peripheral end of said diaghragm floor to said pedestal.

5. A nuclear reactor containment structure as set forth in claim 3 wherein there is provided means for connecting an inner peripheral end of said diaphragm floor to said pedestal.

6. A nuclear reactor containment structure as set forth in claim 4 wherein said connecting means includes anchor bolts.

7. A nuclear reactor containment structure as set forth in claim 4 wherein said connecting means includes anchor plates.

8. A nuclear reactor containment structure as set forth in claim 5 wherein said connecting means includes anchor bolts.

9. A nuclear reactor containment structure as set forth in claim 5 wherein said connecting means includes anchor plates.

10. A nuclear reactor containment structure as set forth in claim 1, wherein an annular elastic sealing element is provided between the outer peripheral end of said diaphragm floor and the closure casing.

11. A nuclear reactor containment structure as set forth in claim 1, wherein said structural steel beams are H-shaped structural steel beams.

12. A nuclear reactor containment structure as set forth in claim 1, wherein said concrete layers comprise two outer layers of unreinforced concrete, for insulating heat, and a layer of reinforced concrete sandwiched therebetween.

13. A nuclear reactor containment structure as set forth in claim 12, wherein said concrete layers have the substantially same thickness as the height of said steel beams to form substantially flat upper and lower surfaces of said diaphragm floor.

14. A nuclear reactor containment structure as set forth in claim 1, wherein the diaphragm floor includes a steel plate layer positioned on the upper side of the structural steel beams.

15. A nuclear reactor containment structure as set forth in claim 11, wherein steel plates are positioned to bridge across the upper side of the lower flanges of the H-shaped structural steel beams.

* * * * *